219-121 SR
9/25/84 XR 4,473,424

United States Patent [19]
Sorko-Ram

[11] Patent Number: 4,473,424
[45] Date of Patent: Sep. 25, 1984

[54] DECORATIVE MIRRORED ARTICLE

[76] Inventor: Paul O. Sorko-Ram, 1111 N. Centerville Rd., Sturgis, Mich. 49091

[21] Appl. No.: 471,117

[22] Filed: Mar. 1, 1983

[51] Int. Cl.[3] .................................... B32B 31/28

[52] U.S. Cl. .................................... 156/268; 156/250; 156/272.8; 219/121 LN; 427/53.1

[58] Field of Search ...................... 427/53.1, 289, 164; 219/121 LH, 121 LJ, 121 LG, 121 LN; 156/272.8, 268, 250

[56] References Cited

U.S. PATENT DOCUMENTS

| | | | |
|---|---|---|---|
| 3,112,850 | 12/1963 | Garibotti | 219/121 W X |
| 3,656,988 | 4/1972 | Stetten et al. | 427/289 X |
| 3,790,744 | 2/1974 | Bowen | 219/121 LJ |
| 4,224,101 | 9/1980 | Tijburg et al. | 219/121 LJ X |
| 4,232,075 | 11/1980 | Gantz et al. | 427/289 X |

FOREIGN PATENT DOCUMENTS

| | | | |
|---|---|---|---|
| 468803 | 7/1937 | United Kingdom | 428/49 |

OTHER PUBLICATIONS

Saifi et al., *Scribing Glass with Pulsed and Q-Switched $CO_2$ Laser,* American Ceramic Soc. Bulletin, 52(11): pp. 838-841. Nov. 1973.

*Primary Examiner*—Evan K. Lawrence
*Attorney, Agent, or Firm*—Krass & Young

[57] ABSTRACT

A decorative covering having a matrix of sections is formed from a sheet cut with a laser. Preferably, the sheet is covered with a removable coating to protect the sheet from damage during the laser cutting process. After the individual sections have been formed the coating is then removed.

10 Claims, 3 Drawing Figures

DECORATIVE MIRRORED ARTICLE

DESCRIPTION

CROSS REFERENCE TO RELATED APPLICATIONS

This application is a continuation-in-part application of U.S. Ser. No. 274,344, entitled "Decorative Mirrored Article and Method of Making Same", filed June 17, 1981, abandoned.

TECHNICAL FIELD

This invention relates to decorative articles and, more particularly, to a method of making decorative coverings having a matrix of individual sections.

BACKGROUND ART

Various coverings have been used in the past to decorate a wide variety of articles such as walls, posts, globes, etc. A particularly attractive covering is a matrix of rectangular mirrors. Unfortunately, it is difficult to construct these mirror matrices in an efficient and aesthetically pleasing manner. One approach is to glue the individual mirrors on the article. Of course, this is extremely tedious work and it is difficult to consistently align the individual sections, especially when the sections are small.

Another approach is disclosed in U.S. Pat. No. 1,930,740 to Desagnat. In that patent, a glass sheet is glued to the wall and then cut up into small rectangular elements. This approach has several drawbacks. First, a considerable amount of work is required of the ultimate consumer in that he must effectively construct the glass matrix himself directly on the article that he wishes to decorate. Secondly, since the glass sheet is first fixed to the article it is difficult to insure that all of the grid lines are equally spaced and aligned, especially where the article has irregular or curved surfaces. Thirdly, the glass plate must be cut all the way through its entire thickness order to separate the individual sections. Since a substantial amount of pressure is required to cut all the way through the sheet, there is a tendency to distort the sheet along the grid lines thereby leaving ragged edges and otherwise degrading the appearance of the coating.

In British patent specification No. 468,803 to Holt a glass sheet is mounted on a foundation of fabric or other material and then cut via a diamond so as to make a flexible mat. Again, rough edges are created which must be smoothed off by rubbing with a flat stone or the like according to the patentee.

SUMMARY OF THE INVENTION

The present invention provides an improved method of making high quality decorative coverings. According to the preferred embodiment, a matrix of individualized section is formed by a coherent beam of light, such as a laser, to cut the individualized sections from a sheet, preferably an acrylic sheet with a mirrored surface. In a preferred embodiment, a protective coating is applied to the top surface of the sheet during the laser cutting process to protect the sheet from damage and destroying its aesthetically pleasing appearance during the laser cutting process. Afterwards, the coating is removed.

This technique provides a high quality product that can be used for a wide variety of purposes. Normally, the sheet is affixed to a flexible substrate having an adhesive surface for mounting the covering onto the article to be decorated. In one embodiment of this invention, the laser is used to cut only partially the way through the acrylic sheet to form score lines therein. Thereafter, the sheet is bent about the score lines to break up the sheet into the individualized sections.

BRIEF DESCRIPTION OF THE DRAWINGS

These and other advantages of the present invention will become apparent upon reading the following specification and by reference to the drawings in which.

DESCRIPTION OF THE PREFFERED EMBODIMENT

Figure 1:
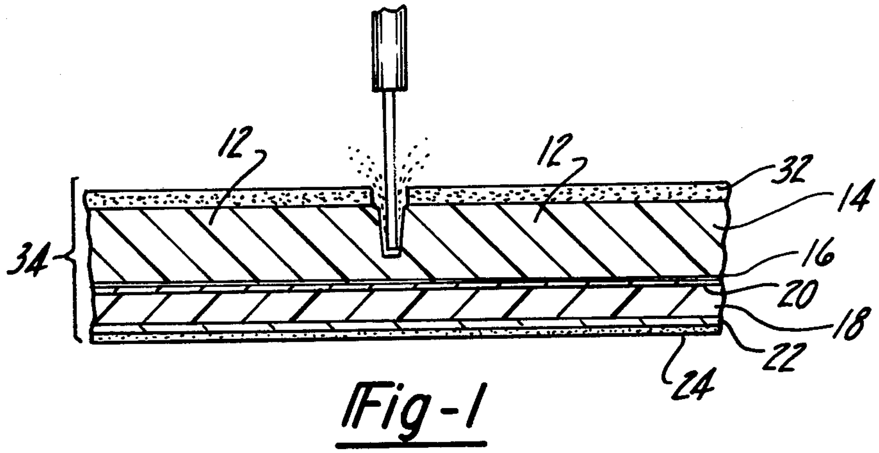
FIG. 1 is a partial side view schematically illustrating the formation of the decorative covering during the laser cutting process.

The drawings illustrate a decorative covering 10 made in accordance with the present invention. Covering 10 is characterized by a matrix of individual rectangular sections 12, The size and shape of sections 12 may vary but preferably they are either square or rectangular. Utilizing the techniques of the present invention sections 12 can be made very small, successful coverings being made with sections ¼ inch square. The individual sections are formed from a sheet 14 of transparent material which may have a reflective coating on its lower surface. Metalization layer 16 serves as this reflective coating in the preferred embodiment so that the covering 10 acts as a mirror. Sheet 14 is made of a clear thermoplastic material such as methylmethacrylate based acrylic.

Sheet 14 is fixed to a flexible substrate 18 by way of a suitable adhesive 20. In the preferred embodiment substrate 18 is a thin layer of polyethylene having a pressure sensitive acrylic based adhesive on its upper surface. One skilled in the art will appreciate that other suitable adhesives and substrates can also be used. For example, substrate 18 can be made of cloth, polyester or vinyl material, and regular adhesive may be used.

Covering 10 further includes, in the preferred embodiment, a layer of pressure sensitive adhesive 22 on the bottom of substrate 18 and a protective sheet of release or backing paper 24 temporarily stuck to adhesive 22. The user may conveniently peel off the paper 24 and apply coating 10 to the article he wishes to decorate. Adhesive 22 and paper 24 may be omitted in other applications in which alternative methods of affixing covering 10 are used.

Each of the individual sections 12 are separated by grid lines 26. The shape of the grid lines may be varied to provide a variety of special effects. Some coverings may include beveled grid lines characterized by a truncated V-shaped groove 28 having smooth sloping surfaces. The lower portion 30 of such grid lines have generally parallel vertically extending sides projecting downward to substrate 18. Other coverings may employ grid lines formed without bevels, i.e. with straight vertically extending sides.

It should be appreciated that the formation of these grid lines is one of the most crucial steps in forming the coverings. If the grid lines are not smooth and uniformly shaped they will ruin the aesthetic characteristics of the covering. From a manufacturer's standpoint, the grid line formation must be accomplished efficiently and in a reliable manner keeping manufacturing costs to a minimum.

To this end, the method of the present invention employs a clear thermoplastic sheet as the starting material for the covering. As noted above, the sheet is preferably made of acrylic. Acrylic has several advantages over glass but it also has its disadvantages as well. For example, the plastic composition of acrylic does not lend itself to being easily cut without causing distortion of the material thereby destroying its aesthetics. It has been discovered that satisfactory results can be obtained by only partially cutting through the sheet with scribes or other cutting instruments to form the score lines and then bending the sheet about the score lines to break the sheet into individual sections. This so-called scribe and break technique using conventional cutters, unfortunately, does not always result in perfectly smooth edges and therefore, some buffing of the grid lines are usually needed to increase the reflective quality of the covering.

Pursuant to the present invention the grid lines 18 are formed by application of a coherent light source such as a laser beam. The use of the laser beam has provided markedly superior results. The width and shape of the grid lines can be controlled by changing the focus of the laser beam. More importantly, the laser formed grid lines are very smooth devoid of the ragged edges or distortion that plagued previous attempts. The smooth edges of the grid lines are apparently due to the fact that the heat generated by the laser is sufficient to cause localized melting of the acrylic causing it to temporarily flow and smooth out the edges.

Unfortunately, the heat generated during the laser cutting process also creates fumes which may settle back and condense on the surface of the sheet. These fumes are believed to be caused by the laser depolymerizing the acrylic, with the depolymerized acrylic fumes tending to attack the previously smooth upper sheet surface thereby leaving it blushed or contaminated.

To solve this problem a protective coating 32 is applied to the top surface of the acrylic sheet which protects it during the laser cutting process. Afterwards it can be removed. Coating 32 may take various forms. Conventional spray furniture polish has been used satisfactorily as has a solution of Knox geletin and water which is preferred. Those skilled in the art will appreciate that other coatings may be used provided that they are sufficient to protect the acrylic sheet during the laser cutting process and may be later removed fairly easily without destroying the aesthetics of the covering.

A particular example of the method of this invention will now be described. Turning now to FIG. 1, an acrylic sheet 14 is coated with a mirror surface 16 by vacuum depositing a thin reflective metal layer on its lower surface. The mirrored sheet 14 is then affixed to substrate 18 by adhesive 16. The protective coating 32 is then applied, for example, by spraying or rolling it onto the upper surface of sheet 14. The backing paper 24 may be applied to complete the subassembly 34.

Figure 2:
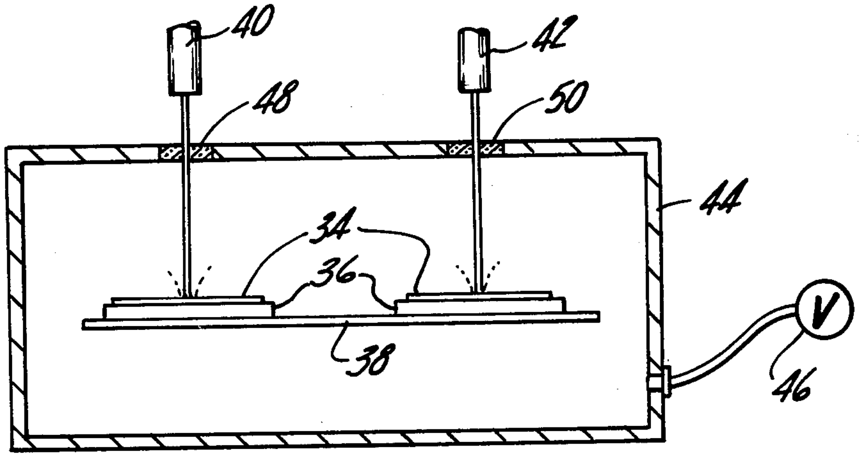
FIG. 2 is a cross-sectional view schematically illustrating apparatus for carrying out the teachings of the present invention.
Figure 3:
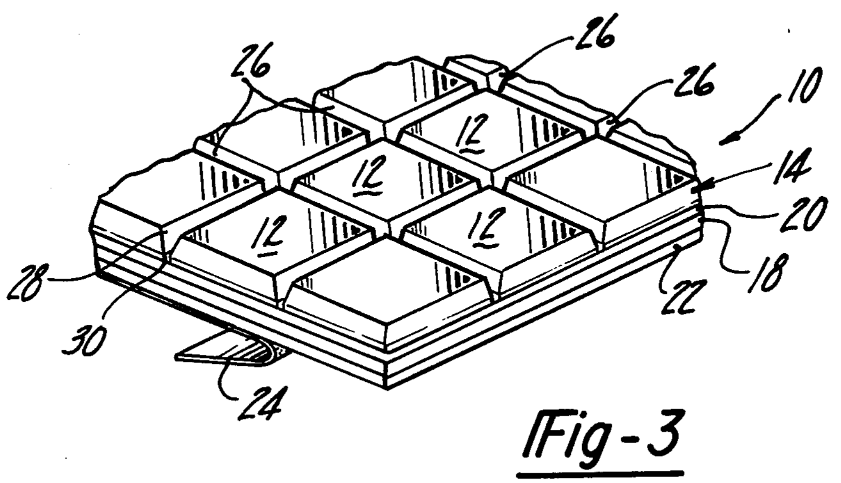
FIG. 3 is a partial perspective view of a covering made in accordance with the present invention.

This subassembly 34 is then placed on a supporting plate 36 which, in turn, is mounted on a computer controlled indexing table 38. In FIG. 2 there is shown a construction for cutting two sheet subassemblies simultaneously. It employs two lasers 40 and 42. In this example, lasers 40, 42 are $CO_2$ lasers generating beams of 200 watts apiece.

Indexing table 38 is then operated to move sheet subassemblies 34 underneath the laser beams to form the desired grid line patterns. The shape and depth of the grid lines can be easily controlled by controlling the focus of the laser beams and the speed of travel of the indexing table 38. For example, to form a beveled cut the beam is focussed to a point beneath the top surface of the sheet so that the beam is relatively wide at the top surface and then converges to chosen an underlying point. On the other hand, to form straight sided cuts the beam is focussed to a narrow beam width before striking the top sheet surface.

Although not critical to the broad concepts of this invention, the sheet assemblies 34 and indexing table 32 may be placed in a vacuum box 44 as shown in FIG. 2. A suitable vacuum source 46 is used to maintain the vacuum within box 44 to suitable conditions such as a vacuum of 20–25 inches Hg. The box is provided with windows 48 and 50 through which laser beams from the exteriorly mounted lasers 40 and 42 may pass. Windows 48 and 50 may be made of a variety of materials that do not adversely effect the beam quality or absorb the laser radiation and still permit vacuum to be created within the box. For example, windows 48 and 50 may be zinc selinide plates. The construction of FIG. 2 is expected to increase productivity by minimizing auto ignition, maintaining flame control and permitting quicker cutting of the sheet assemblies since the reduced pressure lowers the depolymerizing temperature of the acrylic required for material removal.

After the grid lines in the sheet assemblies have been cut they may be fed through a pair of breaker rollers to bend the sheet about the grid lines to insure complete separation. However, this may not always be necessary. Then, the protective coating 32 is removed from the sheets. For example, if the geletin solution is used as a protective coating it may be removed by washing it in warm water.

Those skilled in the art can appreciate that the present invention as described above enables the manufacturer to provide high quality decorative matrices in an efficient manner and that various modifications to the specific example just described will become apparent to them without departing from the spirit of this invention. Therefore, while this invention has been described in connection with a particular example thereof, no limitation is intended thereby except as defined in the appended claims.

I claim:

1. A method of making a decorative covering having a matrix of sections from a sheet of material, said method comprising:

affixing a sheet of transparent acrylic material onto a flexible substrate;

covering the upper surface of the sheet with a removable coating;

directing a loser beam through the coating to cut underlying portions of the sheet to form grid lines defining a matrix of sections, with the coating protecting noncut portions of the sheet from damage during the laser cutting process; and removing the coating.

2. A method of claim 1 wherein said acrylic sheet has a metalization layer on its lower surface thereby creating a mirror-like surface.

3. The method of claim 1 wherein said coating is a solution of gelatin and water.

4. The method of claim 1 wherein said laser beam is used to partially cut through the sheet and wherein the method further comprises the step of bending the sheet about the grid lines to break the sheet into individual sections.

5. The method of claim 1 wherein said sheet is mounted in a vacuum chamber.

6. The method of claim 5 wherein said chamber includes a window through which the beam passes into the chamber.

7. The method of claim 6 wherein said window is formed of a material which does not substantially absorb energy from the laser.

8. The method of claim 7 which further comprises plural laser beams operating on plural sheets mounted on an indexing table which simultaneously moves the sheets underneath respective laser beams.

9. The method of claim 1 which further comprises the step of focussing the beam so as to form bevelled cuts for the grid lines.

10. A method of making a decorative covering having a matrix of sections, said method comprising:

using a coherent beam of light to form grid lines in a sheet of acrylic material to define the matrix of sections.

* * * * *